(12) United States Patent
Wasser

(10) Patent No.: US 9,080,656 B2
(45) Date of Patent: Jul. 14, 2015

(54) APPARATUS FOR CONVERTING A ROTATIONAL MOVEMENT INTO AN AXIAL MOVEMENT

(75) Inventor: Tobias Wasser, Freiburg (DE)

(73) Assignee: Auma Riester GmbH + Co. KG, Mullheim (DE)

( * ) Notice: Subject to any disclaimer, the term of this patent is extended or adjusted under 35 U.S.C. 154(b) by 290 days.

(21) Appl. No.: 13/580,329

(22) PCT Filed: Feb. 11, 2011

(86) PCT No.: PCT/EP2011/000642
§ 371 (c)(1),
(2), (4) Date: Aug. 21, 2012

(87) PCT Pub. No.: WO2011/101107
PCT Pub. Date: Aug. 25, 2011

(65) Prior Publication Data
US 2012/0318082 A1 Dec. 20, 2012

(30) Foreign Application Priority Data

Feb. 22, 2010 (DE) .......................... 10 2010 008 861
Jul. 17, 2010 (DE) .......................... 10 2010 034 843

(51) Int. Cl.
*F16H 25/20* (2006.01)
*F16K 31/04* (2006.01)
*F16K 31/53* (2006.01)

(52) U.S. Cl.
CPC .......... *F16H 25/2015* (2013.01); *F16K 31/047* (2013.01); *F16K 31/53* (2013.01); *Y10T 74/18688* (2015.01)

(58) Field of Classification Search
CPC ..... F16H 25/2015; F16K 31/53; F16K 31/47; F16K 31/48; Y10T 74/18688

USPC ............ 74/89.37, 89.38, 89.15, 89.39, 89.23; 251/129.12, 129.13, 92, 93, 249.5, 251/284, 285; 192/141
See application file for complete search history.

(56) References Cited

U.S. PATENT DOCUMENTS 2,321,442 A 6/1943 Wilson
2,398,841 A * 4/1946 Morris ......................... 74/89.37
(Continued)

FOREIGN PATENT DOCUMENTS

| DE | 40 19 482 A1 | 1/1992 |
| DE | 4019 482 A1 | 1/1992 |
| DE | 10 2008 014 995 A1 | 9/2009 |
| WO | 2006/063874 A1 | 6/2006 |
| WO | WO 2006/063874 A1 | 6/2006 |

OTHER PUBLICATIONS

International Search Report in PCT/EP2011/000642, dated Aug. 28, 2012, English translation.
International Search Report.
Notice of Allowance and Official Action from German Patent Office.

*Primary Examiner* — William McCalister
*Assistant Examiner* — Ian Paquette
(74) *Attorney, Agent, or Firm* — Bacon & Thomas, PLLC

(57) ABSTRACT

An apparatus for converting a rotational movement into an axial movement. A threaded rod is provided, on which a nut is arranged to be movable axially to the threaded rod. At least one blocking structure is provided, which is so arranged that it blocks rotational movement of the nut during the axial movement along the threaded rod. There is provided on the threaded rod at least one end stop, which limits axial movement of the nut along the threaded rod. Between the axially movable nut and the end stop, a wedge lock washer pair is arranged. The wedge lock washer pair is so embodied that the wedge lock washers are brought into engagement by the pressing of the nut against the end stop and produce a prestress torque, wherein torque for releasing the nut from the end stop is smaller, essentially by the prestress torque of the wedge lock washer pair, than the torque applied as the nut first pressed against the end stop.

14 Claims, 5 Drawing Sheets

(56) References Cited

U.S. PATENT DOCUMENTS

| | | | |
|---|---|---|---|
| 2,715,341 A * | 8/1955 | Hogan | 74/89.37 |
| 3,029,660 A | 4/1962 | Sears | |
| 4,858,481 A | 8/1989 | Abraham | |
| 5,255,882 A | 10/1993 | Schroppel | |
| 5,626,449 A * | 5/1997 | McKinlay | 411/149 |
| 5,868,032 A * | 2/1999 | Laskey | 74/89.37 |
| 2003/0167867 A1 * | 9/2003 | Lange et al. | 74/89.37 |

* cited by examiner

APPARATUS FOR CONVERTING A ROTATIONAL MOVEMENT INTO AN AXIAL MOVEMENT

TECHNICAL FIELD

The invention relates to an apparatus for converting a rotational movement into an axial movement, wherein a threaded rod is provided, on which a nut is arranged to be movable axially to the threaded rod, wherein at least one blocking means is provided, which is so arranged that it blocks rotational movement of the nut during the axial movement along the threaded rod, and wherein at least one end stop is provided, which limits axial movement of the nut along the threaded rod.

BACKGROUND DISCUSSION

Preferably, the above-mentioned apparatus is applied in an electrical actuator for open and/or closed loop control of a flow regulating device. The flow regulating device is, for example, a valve, a gate, a throttle or a flap. Depending on the flow regulating device to be actuated, the movement performed by the actuator is a rotation or a translation, in given cases, a rotation of less than 360 degrees. The invention is not limited to the embodiment of an actuator. Rather, it can be used in any case where a traveling nut runs against a stop and then subsequently must be capable of being easily released, i.e. backed away, therefrom.

In actuators, the torque transmission between an electric motor, or, in general, an actuating element, and the flow regulating device occurs by way of a speed reduction transmission, which, depending on the case of application, can be a bevel gear, or spur gear, transmission, a worm gear transmission, a superimposed transmission, or a lever transmission. The speed reduction transmission is necessary, in order to convert the high RPM of the electric motor into the desired, in high measure constant, output RPM for actuating the flow regulating device. The assignee manufactures actuators meeting the most varied of requirements. Thus, torque in the case of rotary drives can reach to 32,000 Nm; in the case of rotary drives with less than 360 degree range, torques can be implemented at up to 360,000 Nm.

Used for reducing the RPM of the electric motor down to the output RPM, with which the flow regulating device is to be actuated, is, for example, a worm gear transmission with worm shaft, worm and engaging worm wheel, in connection with a planetary gear transmission. In order to assure that the worm gear transmission remains in the desired rest position in the case of shutdown of the electric motor, the worm gear transmission includes a self-locking feature. Worm gear shaft and output hollow shaft with worm wheel rotate usually in ball-, or dry bearings.

The worm is arranged on the worm gear shaft shiftably between two measuring spring packages, so that the worm, in the case of a torque to be transferred, experiences a translational movement relative to the worm gear shaft. This shifting, which is a measure for the torque being transferred, is forwarded to a control unit. The interior of the transmission is filled with lubricant, so that maintenance free operation is assured over a longer period of time.

Depending on the type of construction of the flow regulating device, the rotary drive must be turned off in the end positions path, or torque, dependently. Provided for this in the control unit are usually two independent measuring systems, namely a path circuit and a torque circuit, which measure, respectively, traveled actuation path distance and the torque applied on the output shaft. The reaching of a desired position is sensed by the control unit via a switch, whereupon the control unit turns the electric motor off.

In order to prevent damage to the transmission or the flow regulating device in the case of malfunction and, thus, in the case of travel beyond one of the end positions, two end stops are provided, which limit the travel of the nut. However, the coming of the nut into contact with one of the end stops occurs with high torque, so that the release torque involved with getting the nut back off the end stop is correspondingly high. Making this more difficult is that grease in the contact between end stop and nut exudes away over time, whereby the release torque compared with the tightening torque even increases. This leads to considerable problems in the case of restarting a stuck actuator following a malfunction. For the purpose of reducing the release torque, in the case of known solutions of the assignee, the bearing area of the nut is, therefore, rounded, i.e. given a convex shape.

SUMMARY OF THE INVENTION

An object of the invention is, in the case of contact between nut and an end stop, significantly to lessen the release torque compared with the tightening torque.

The object is achieved by features including that a wedge lock washer pair is arranged between the axially movable nut and the end stop, wherein the wedge lock washer pair is so embodied that the wedge lock washers are brought into engagement by the pressing of the nut against the end stop and produce a prestress torque, and wherein the torque for releasing the nut from the end stop is smaller, essentially by the prestress torque of the wedge lock washer pair, than the torque applied as the nut first pressed against the end stop.

As already indicated above, the apparatus of the invention is preferably an actuator for actuating a flow regulating device, wherein there is provided between an actuating element and the flow regulating device a speed reduction transmission, especially a speed reduction transmission embodied as a worm gear transmission, wherein the drive shaft of the worm gear transmission in the form of a threaded rod has an external thread with a defined thread slope, wherein arranged on the drive shaft are the axially movable nut and two end stops limiting the maximum travel of the nut, and wherein arranged between the nut and each of the two end stops is, in each case, a wedge lock washer pair.

The flow regulating device is a control element, especially a valve or a gate, in each case, with spindle and threaded sleeve, a throttle, a flap, a ball valve or a damper.

As already explained above, the actuating element involves an electric motor or a separately actuatable, operating wheel, especially a separately actuatable, hand wheel. The separately actuatable, operating wheel assures that the actuator can still be operated in an emergency, e.g. in the case of a power outage or in case the nut gets stuck against the end stop. The operating wheel is required to conform to safety standards for process automation. The operating wheel is usually a hand wheel, which is operated manually by the operating personnel, whereby the flow regulating device can be brought to a desired setting.

An advantageous further development of the apparatus of the invention provides that the two wedge lock washers of the wedge lock washer pair, respectively the wedge lock washer pairs, have wedge surfaces on the mutually facing, inner surfaces, wherein the slope of the wedge surfaces and the slope of the external thread of the threaded rod, i.e. the drive shaft, are oriented oppositely to one another.

Especially, it is provided that the slope of the wedge surfaces is greater than the slope of the external thread of the threaded rod, i.e. the drive shaft.

Preferably, radial ribs are provided on the outer surfaces of the wedge lock washers, surfaces which face away from one another. Furthermore, it is provided in connection with the apparatus of the invention that the wedge lock washers of each wedge lock washer pair are manufactured, as a function of the material of the contact surfaces of the end stop and the nut, of a material, which assures that the radial ribs on the outer surfaces of the wedge lock washers press, in the case of contact, shape-interlockedly into the corresponding contact surfaces of the nut and the end stop, respectively. A sliding or slipping on the contact surface of the nut, respectively the end stop, is then no longer possible.

Wedge locking washers, as such, are already known. These are used, however, for securing screw connections and have, thus, in reference to the solution of the invention, a contrary effect. The manufacturer of known wedge locking washers is the firm, Nord-Lock. The known wedge locking washers have wedge surfaces on the inside and radial ribs on the outside. The shape of the wedge surfaces is so selected that the angle of the wedge surfaces is always greater than the thread slope. In such case, the slope of the wedge surfaces and the thread slope have the same orientation. The washers are pairwise adhered and so applied that the internally lying wedge surfaces lie on one another. If the screw, respectively the nut, is tightened, then the radial ribs of the wedge locking washers engage shape-interlockedly into the counter-surfaces. The washer pair sits fixed in place, and movements are only still possible between the wedge surfaces. Already in the case of the slightest rotational movement in the release direction, there occurs through the sliding over one another of the internally lying wedge surfaces a so-called click effect; the wedge surfaces wedge into one another. Due to the wedge action, an increasing of the prestress force occurs, whereby the screw, respectively the nut, self-secure. Thus, the screwed connection is secure even under extreme vibrations and dynamic loading.

As already stated, the solution of the invention provides an opposite effect: Here, the wedge surfaces are so embodied that, in the case of releasing the nut from the relevant end stop, the wedge surfaces on the inner surfaces of the wedge lock washers are shiftable relative to one another, wherein the torque to be applied in the case of the releasing of traveling nut from end stop is reduced relative to the torque applied when the nut first came to rest against the end stop, essentially by the amount of the prestress force of the wedge lock washer pair resulting from the tightening. The loading of the drive with high release torques is thereby effectively reduced.

It is advantageous in connection with the apparatus of the invention when, in the case of the actuator, a wedge lock washer of one of the two wedge lock washer pairs is connected on its outer surface fixedly with the corresponding contact surface of the end stop or the nut.

An advantageous embodiment of the apparatus of the invention provides that the end stop, or the end stops, are either affixed to the threaded rod, i.e. the drive shaft, or that at least one displacement mechanism is provided, which enables a variable positioning of the end stop, or end stops. Via the variable positioning, it is possible to adapt the displacements of the flow regulating device optimally to the given conditions.

BRIEF DESCRIPTION OF THE DRAWINGS

The invention will now be described in greater detail based on the appended drawing, the figures of which show as follows.

DETAILED DISCUSSION IN CONJUNCTION WITH THE DRAWINGS

Figure 1:
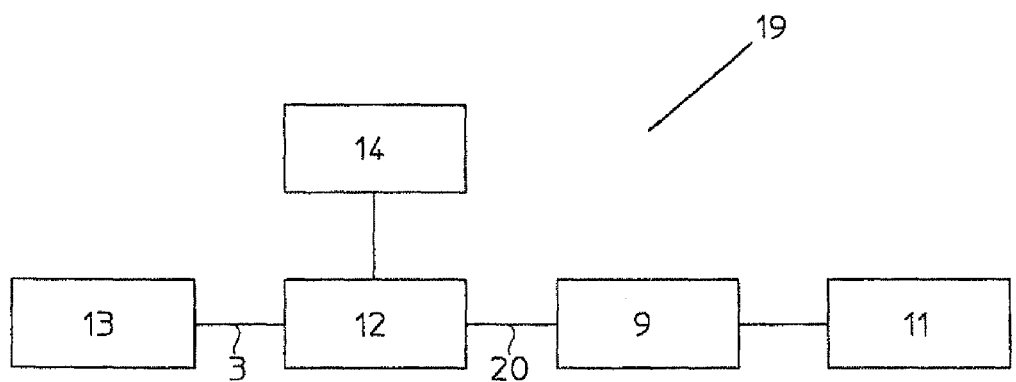
FIG. 1 is a schematic representation of an actuator.

FIG. 1 is a schematic representation of an actuator 19. Actuator 19 serves for actuating the flow regulating device 11 and is usually composed of an electric motor 13, an input drive 12 with a not separately illustrated, electrical control unit, and a speed reduction transmission 9, the output of which actuates a flow regulating device 11. The flow regulating device 11 is, for example, a valve, a gate, a throttle or a flap. The electrical control unit can be integrated in the input drive 12 of the speed reduction transmission 9, it can be an add-on to the input drive 12 or it can be embodied as a separate component.

The actuators used in process technology (especially processes, in which a product is made from a raw or starting material by the application of chemical, physical or biological procedures) for flow regulating devices 11 are designed such that they can provide high torques (30-500,000 Nm) at low RPMs (4-180 RPM), wherein the torque must also be highly constant over small angles of rotation.

The torque transmission between electric motor 13 and flow regulating device 11 occurs via a speed reduction transmission 9. Speed reduction transmission 9 is necessary, in order to convert the high RPM of the electric motor 13 into the desired, highly constant, output RPM for actuating the flow regulating device 11. Various transmissions can be applied as speed reduction transmission 9. Examples include a bevel gear- or spur gear transmission, a worm gear transmission, a superimposed transmission or a lever transmission. The torque range in the case of rotary drives reaches up to a torque of 32,000 Nm; in the case of rotary drives with less than 360 degree range, torques up to 360,000 Nm can be implemented.

In order to meet process automation safety standards, the actuator must be operable in emergencies via a separately actuatable, operating wheel 14. This operating wheel 14 is used, moreover, also in the case of start-up, or re-start, of the actuator 12 after a malfunction. The operating wheel 14 is usually a manually operated wheel for use by operating personnel, which allows them to bring the flow regulating device 11, for instance manually, into a desired setting.

For the purpose of isolating hand operation and motor operation from one another, a coupling mechanism (not separately shown in FIG. 1) is provided. The coupling mechanism is usually so embodied and/or arranged that, in the case of motor operation, the electric motor 13 is directly coupled with the output shaft 20 and the operating wheel 14 is uncoupled, while, in manual operation, the output shaft 20 on the input to the transmission is coupled with the operating wheel 14 and the electric motor 13 is uncoupled. In this way, isolation between motor operation and hand operation is provided.

Especially, the coupling mechanism is embodied in such a manner that the operating wheel 14 is automatically uncoupled from the drive shaft 3, as soon as the input drive 12 is working with motor operation—motor operation thus has precedence over hand operation. Actuators using these principles are available from the assignee.

Figure 2:
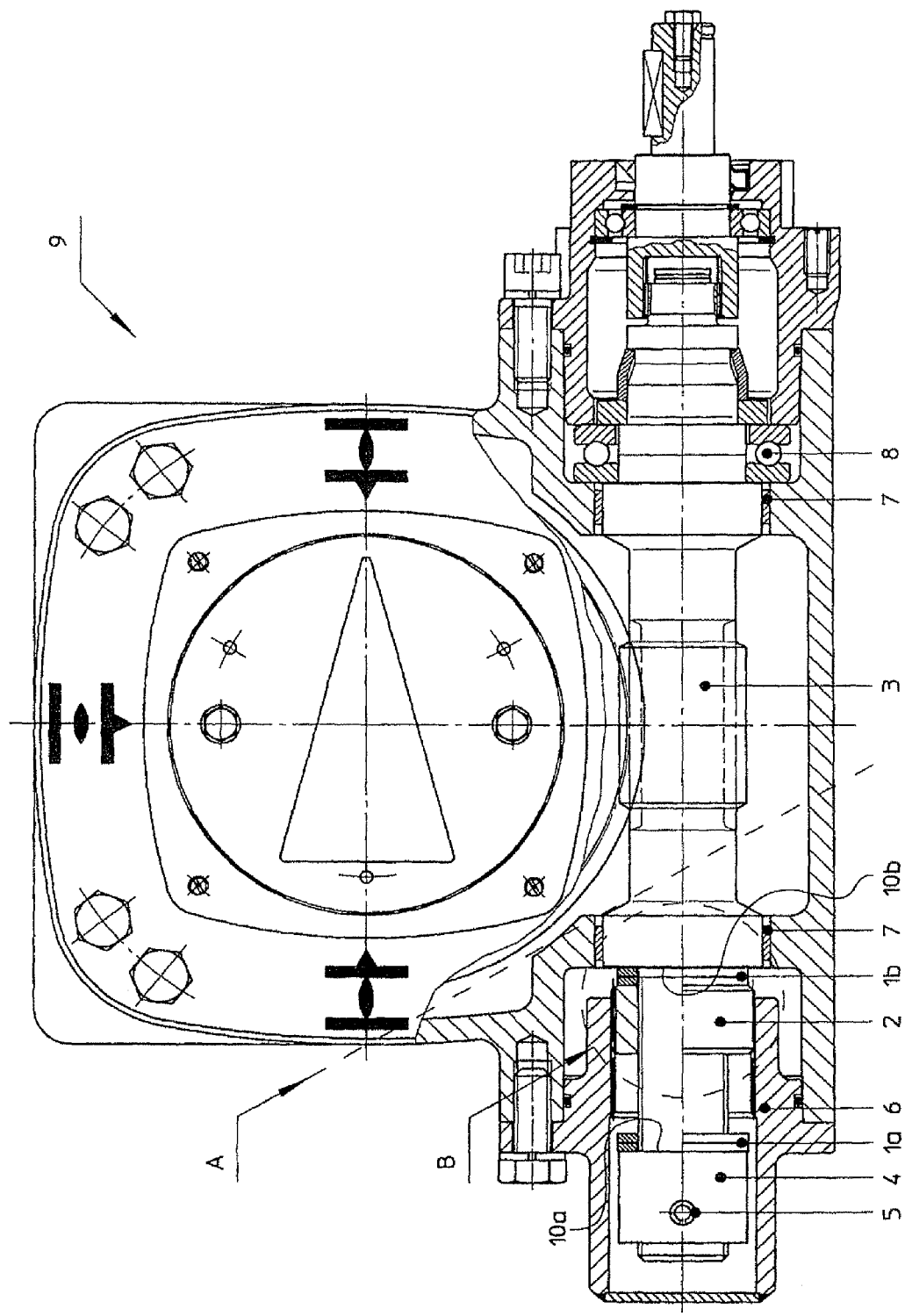
FIG. 2 is a longitudinal section through an actuator for actuating a flow regulating device.

FIG. 2 shows a longitudinal section through an embodiment of the solution of the invention, in the case of which a worm gear transmission 9 is applied for reducing the RPM. The drive, or worm gear, shaft 3 is journaled in the housing 6 via two radial bearings 7 and an axial bearing 8. The transmission interior is filled with lubricant, so that maintenance free operation of the actuator over a longer period of time is assured.

Depending on type of construction of the flow regulating device 11, the rotary drive is terminated on its ends path, or torque, dependently. Provided for this in the control unit are usually two independent measuring systems, namely a path circuit and a torque circuit, which measure, respectively, the traveled actuating path, and the torque applied on the output shaft. The reaching of a desired position is signaled to the control unit via a switch, whereupon the control unit turns the electric motor 13 off.

Figure 2A:
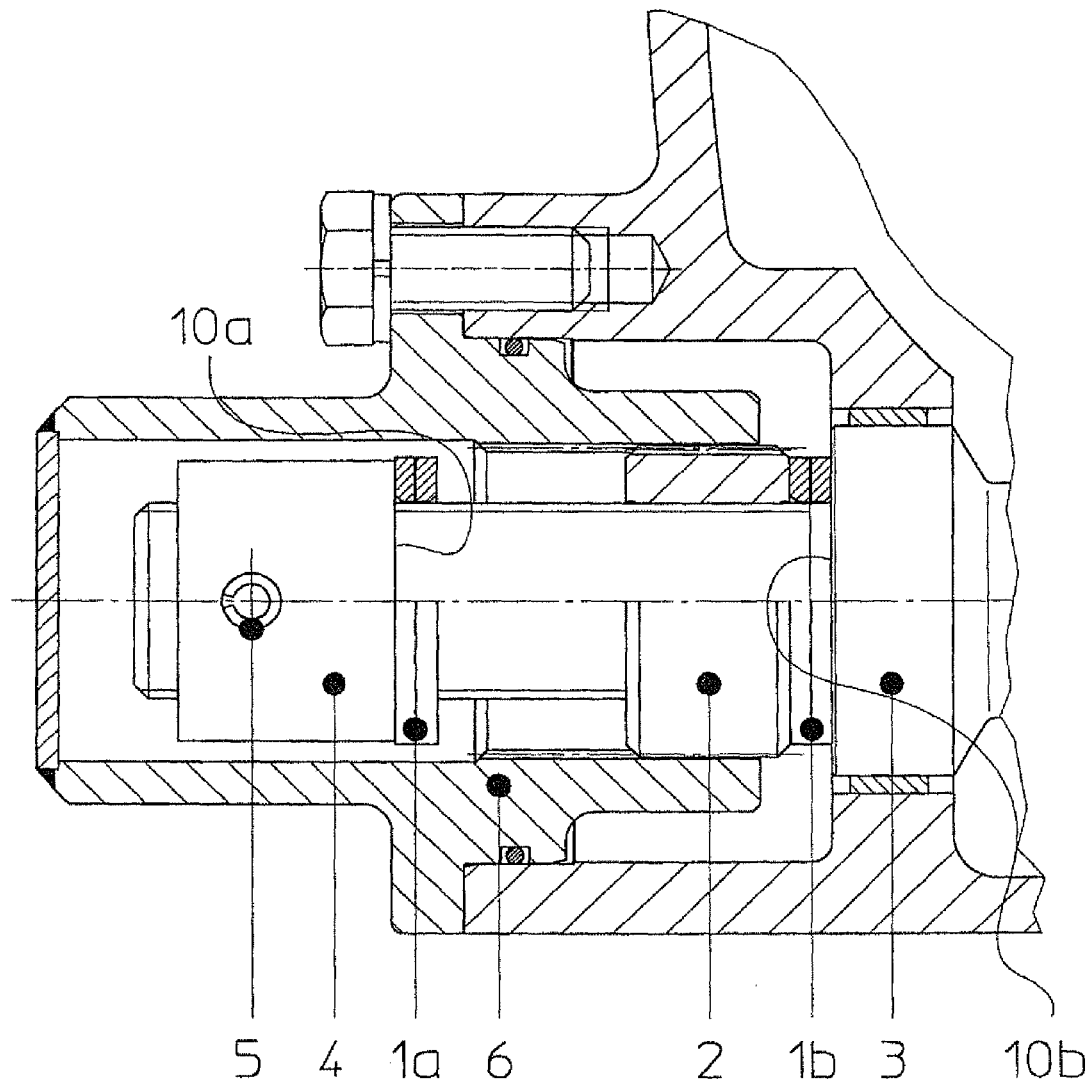
FIG. 2a is a longitudinal section in the region of the actuator, in which two fixedly positioned end stops are provided.
Figure 2B:
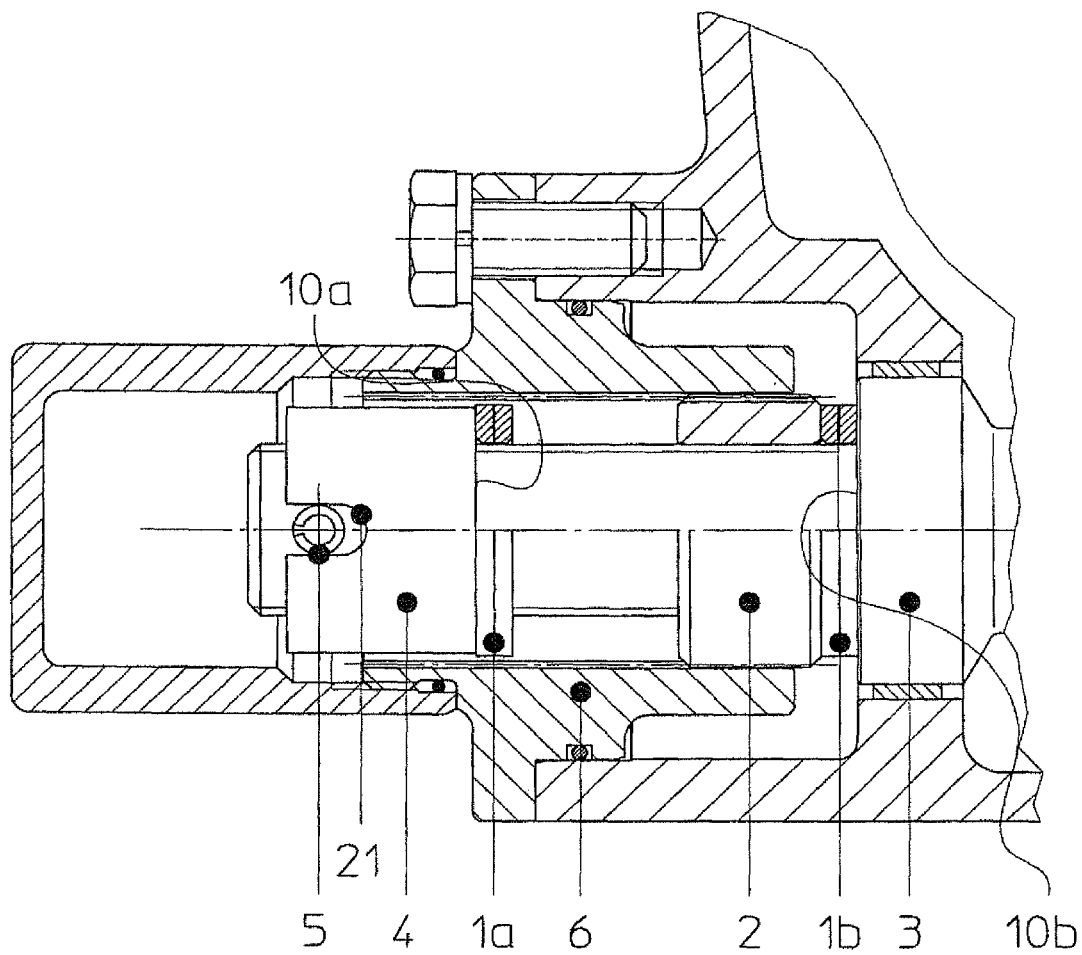
FIG. 2b is a detail drawing of section B of FIG. 1, wherein one of the end stops is embodied to be displaceable.

In order, in the case of malfunction, to avoid an unlimited translational movement, two end stops 10*a*, 10*b* are provided. Two different variants of end stops are presented in FIGS. 2*a*, 2*b*. Arranged on the worm gear shaft 3 is a nut 2 movable axially relative to the worm gear shaft 3. By means of a blocking means (not separately illustrated in FIG. 2), rotational movement of the traveling nut, nut 2, is prevented, so that it can travel axially along the worm gear shaft 3. Provided on worm gear shaft 3 in two end regions are end stops 10*a*, 10*b*, which limit the axial movement of the nut 2 along the worm gear shaft 3. End stop 10*a* is an end nut 4, which, in the case of the embodiment shown in FIG. 2*a*, is secured in a fixed position on the drive shaft 3. In the case of the embodiment shown in FIG. 2*b*, the nut 2 is freely displaceable within a distance predetermined by the longitudinal dimension of the elongated hole 21. The displaceable end stop 4 provides an optimal adapting of the displacement path to the respectively desired displacement. In the two embodiments, the securement of the end nut 4 occurs preferably via a coiled, spring-type, straight pin 5. End stop 10*b* is defined by the particular embodiment of the worm shaft 3.

As already explained above, nut 2, in the case of malfunction—thus in the case of failure of the displacement path control unit—, runs against one of the end stops 10*a*; 10*b*. Since this occurs with high torque, it is subsequently extremely difficult to release the solidly stuck nut 2 from the relevant end stop 10*a*, 10*b*.

According to the invention, consequently, there is arranged between the axially movable nut 2 and the end stops 10*a*, 10*b*, in each case, a wedge lock washer pair 1. Each wedge lock washer pair 1*a*, 1*b* is composed of two wedge lock washers 1.1, 1.2, which are so embodied that the wedge lock washers 1.1, 1.2 are brought into engagement by the pressing of the nut 2 against the end stop 10*a*, 10*b*. The wedge lock washers 1.1, 1.2 produce, in such case, a torque for releasing the nut 2 from the corresponding end stop 10*a*, 10*b*, which is smaller, essentially by the prestress torque of the corresponding wedge lock washer pair 1*a*, 1*b*, than the torque for the first pressing of the nut 2 against the end stop 10*a*, 10*b*. Thus, the release torque is a certain amount smaller than the tightening torque, and release of a solidly stuck nut 2, respectively a re-starting of a stuck actuator, is significantly facilitated.

Figure 3:
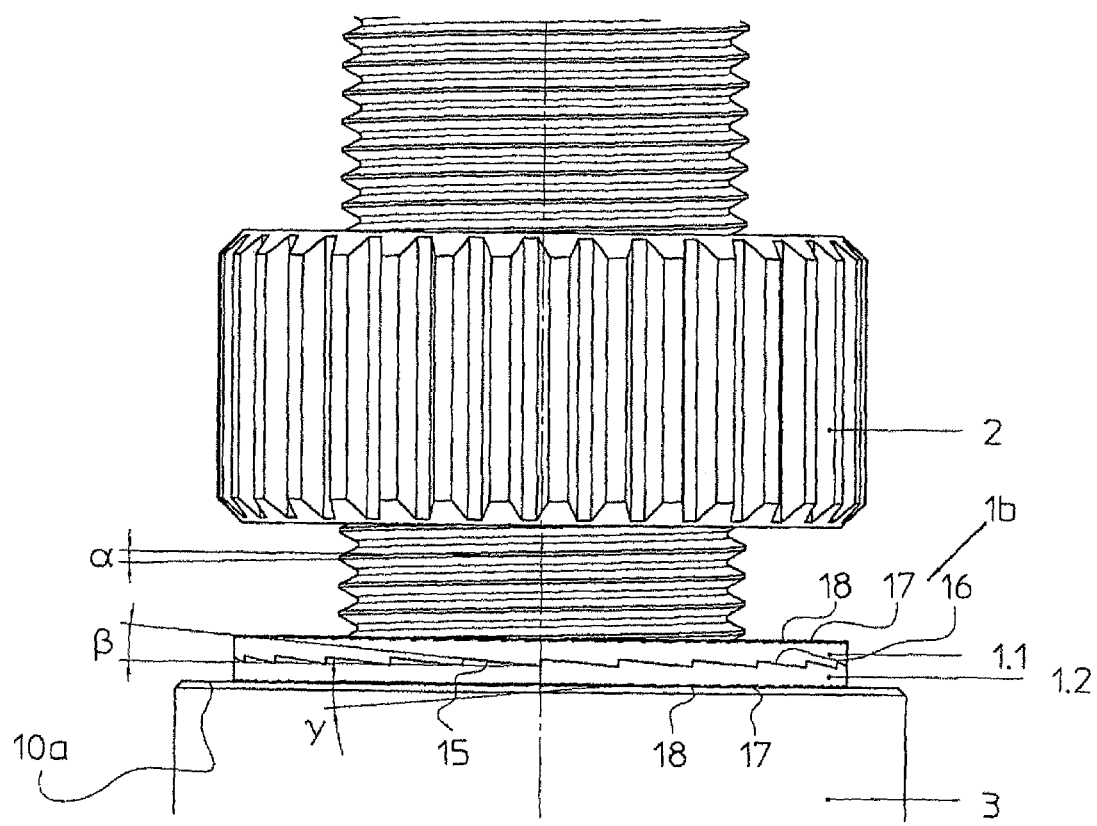
FIG. 3 is a side view including a wedge lock washer pair of the invention.

FIG. 3 shows, in side view, an enlarged representation including a wedge lock washer pair 1*b* of the invention. The drive shaft/worm gear shaft 3 has an external thread with a defined thread slope $\alpha$. Arranged axially shiftably on the drive shaft 3 is the traveling nut, nut 2. Provided between the traveling nut 2 and an end stop 10*b* carried on the drive shaft 3 is a wedge lock washer pair 1*b* composed of wedge lock washers 1.1, 1.2. Arranged on the mutually facing, inner surfaces 15 of the wedge lock washers 1.1, 1.2 are wedge surfaces 16, whose slope $\beta$ is oriented oppositely to the slope $\alpha$ of the external thread of the drive shaft 3. In this way, it is achieved that, in the case of nut 2 getting stuck against the end stop 10*b*, the release torque is lessened by the prestress torque of the two wedge lock washers 1.1, 1.2. Preferably, the slope $\beta$ of the wedge surfaces 16 is greater than the slope $\alpha$ of the external thread of the drive shaft 3. In this way, a higher prestress torque of the wedge lock washers 1.1, 1.2 can be achieved.

Radial ribs 18 are provided on the outer surfaces 17 of the wedge lock washers 1.1, 1.2. The outer surfaces 17 face away from one another. The wedge lock washers 1.1, 1.2 of each wedge lock washer pair 1*a*, 1*b* are, as a function of the material of the contact surfaces of the respective end stops 10*a*, 10*b* and the nut 2, manufactured of material, which assures that the radial ribs 18 on the outer surfaces 17 of the wedge lock washers 1.1, 1.2 can, in the case of contact, press shape-interlockingly into the corresponding contact surfaces of the nut 2, respectively the end stops 10*a*, 10*b*. With the outer surfaces of the wedge lock washers 1.1, 1.2 thus locked to the end stop 10*b*, respectively the nut 2, the wedge surfaces 16 on the inner surfaces 15 of the wedge lock washers 1.1, 1.2 can shift relative to one another in the case of releasing the nut 2 from the corresponding end stop 10*b*. In this way, the tightening torque is greater than the release torque of the traveling nut 2 from the end stop 10*b*, essentially by the prestress force of the wedge lock washer pair 1*b*, such as results from the tightening. An alternative is to connect one of the two wedge lock washers non-releasably with the nut 2 or the end stop 10*b*.

The invention claimed is:

1. An apparatus for converting a rotational movement into an axial movement, comprising:
    a nut;
    a threaded rod on which said nut is arranged to be movable axially to said threaded rod;
    at least one blocking means, which is so arranged that it blocks rotational movement of said nut during the axial movement along said threaded rod;
    at least one end stop, which limits axial movement of said nut along said threaded rod; and
    a wedge lock washer pair arranged between said axially movable nut and said end stop, wherein:
    said wedge lock washer pair is so embodied that said wedge lock washers are brought into engagement by the pressing of said nut against said end stop and produce a prestress torque; and
    torque for releasing said nut from said end stop is smaller, than the torque applied as said nut first pressed against said end stop.

2. The apparatus as claimed in claim 1, wherein:
    the apparatus is an actuator for actuating a flow regulating device, the apparatus further comprising:
    an actuating element; and
    a speed production transmission, said speed reduction transmission situated between said actuating element and said flow regulating device, further wherein:
    said speed reduction transmission, is embodied as a worm gear transmission;

the drive shaft of said worm gear transmission, is in the form of a threaded rod has an external thread with a defined thread slope;

arranged on said drive shaft are said axially movable nut and two end stops limiting the maximum travel of said nut; and arranged between said nut and each of said two end stops is, in each case, a wedge lock washer pair.

3. The apparatus as claimed in claim 1, further comprising:

radial ribs on the outer surfaces of said wedge lock washers, wherein:

said outer surfaces face away from one another.

4. The apparatus as claimed in claim 1, wherein:

said wedge lock washers of each wedge lock washer pair are manufactured, as a function of the material of the contact surfaces of said end stop and said nut, of a material, which assures that radial ribs on said outer surfaces of said wedge lock washers press, in the case of contact, shape-interlockedly into the corresponding contact surfaces of said nut and said end stop, respectively.

5. The apparatus as claimed in claim 1, wherein:

in the case of releasing said nut from the relevant end stop, said wedge surfaces on said inner surfaces of said wedge lock washers are shiftable relative to one another; and the tightening torque is greater than the release torque of said traveling nut from the end stop by the prestress force of said wedge lock washer pair, which results from the tightening.

6. The apparatus as claimed in claim 1, wherein:

said end stop, or said end stops, are either affixed to said threaded rod, or that at least one displacement mechanism is provided, which enables a variable positioning of said end stop, or end stops.

7. The apparatus as claimed in claim 1, wherein:

the torque for releasing said nut from said end stop is effected by the prestress torque of said wedge lock washer pair.

8. The apparatus as claimed in claim 1, wherein:

said two wedge lock washer of said wedge lock washer pair, respectively the wedge lock washer pairs, have wedge surfaces on the mutually facing, inner surfaces;

the slope ($\beta$) of said wedge surfaces and the slope ($\alpha$) of said external thread of the threaded rod, are oriented oppositely to one another.

9. The apparatus as claimed in claim 8, wherein:

the slope ($\beta$) of said wedge surfaces is greater than the slope ($\alpha$) of said external thread of the threaded rod.

10. The apparatus as claimed in claim 8, wherein:

in the case of the actuator, a wedge lock washer of one of said two wedge lock washer pairs is connected on its outer surface fixedly with the corresponding contact surface of said end stop or said nut.

11. The apparatus as claimed in claim 8, wherein:

the actuating element is an electric motor or a separately actuatable, operating wheel, especially a separately actuatable, hand wheel.

12. The apparatus as claimed in claim 8, wherein: the apparatus is an actuator for actuating a flow regulating device; and wherein the flow regulating device is a control element, with spindle and threaded sleeve, a throttle, a flap, a ball valve or a damper.

13. The apparatus as claimed in claim 12, wherein:

said flow regulating device is a valve.

14. The apparatus as claimed in claim 12, wherein:

said flow regulating device is a gate.

\* \* \* \* \*